United States Patent
Radu et al.

(10) Patent No.: US 10,956,912 B2
(45) Date of Patent: Mar. 23, 2021

(54) AUTOMATIC REGISTRATION AND GENERATION OF CONSUMER PAYMENT CREDENTIALS USING INTERNET-CONNECTED APPLIANCES

(71) Applicant: MasterCard International Incorporated, Purchase, NY (US)

(72) Inventors: Cristian Radu, Beauvechain (BE); Fikret Ates, Namur (BE); Sebastien Pochic, Brussels (BE); Lukas Ekselius, Overijse (BE)

(73) Assignee: Mastercard International Incorporated, Purchase, NY (US)

(*) Notice: Subject to any disclaimer, the term of this patent is extended or adjusted under 35 U.S.C. 154(b) by 1263 days.

(21) Appl. No.: 15/091,290

(22) Filed: Apr. 5, 2016

(65) Prior Publication Data

US 2016/0224981 A1 Aug. 4, 2016

Related U.S. Application Data

(63) Continuation of application No. 13/963,141, filed on Aug. 9, 2013, now abandoned.
(Continued)

(51) Int. Cl.
*G06Q 40/00* (2012.01)
*G06Q 20/40* (2012.01)
(Continued)

(52) U.S. Cl.
CPC .......... *G06Q 20/405* (2013.01); *G06Q 10/00* (2013.01); *G06Q 20/027* (2013.01); *G06Q 20/12* (2013.01);
(Continued)

(58) Field of Classification Search
CPC ...... G06Q 20/40; G06Q 40/12; G06Q 20/401; G06Q 20/102; G06Q 20/322;
(Continued)

(56) References Cited

U.S. PATENT DOCUMENTS 9,203,876 B2 * 12/2015 Amber ................ H04L 67/1097
2002/0049804 A1 4/2002 Rodriguez et al.
(Continued)

FOREIGN PATENT DOCUMENTS

WO 01/22325 A1 3/2001
WO 02/42954 A1 5/2002

OTHER PUBLICATIONS

Reporo signs first retailers up to mobile marketplace. New Media Age; London (Oct. 28, 2004): 4. (Year: 2004).*
(Continued)

*Primary Examiner* — Lalita M Hamilton
(74) *Attorney, Agent, or Firm* — Buckley, Maschoff & Talwalkar LLC

(57) ABSTRACT

Methods and systems for generating consumer payment credentials using an Internet-connected appliance. In an embodiment, a primary Internet-connected appliance receives purchase transaction information from a secondary appliance. The process also includes generating a purchase transaction authorization request based on purchase transaction information and on payment account credential data that is stored locally in a dedicated storage element, transmitting the purchase transaction authorization request via the Internet to a gateway server computer, receiving a purchase transaction authorization response, and transmitting the purchase transaction authorization response via a domestic network to the secondary appliance for display to a consumer.

16 Claims, 9 Drawing Sheets

Related U.S. Application Data

(60) Provisional application No. 61/681,929, filed on Aug. 10, 2012.

(51) Int. Cl.
  *G06Q 20/12* (2012.01)
  *G06Q 20/02* (2012.01)
  *G06Q 30/00* (2012.01)
  *G06Q 10/00* (2012.01)

(52) U.S. Cl.
  CPC ........... *G06Q 20/40* (2013.01); *G06Q 20/401* (2013.01); *G06Q 30/00* (2013.01)

(58) Field of Classification Search
  CPC .. G06Q 20/3674; G06Q 20/405; G06Q 40/04; G06Q 10/083; G06Q 20/12; G06Q 20/20; G06Q 20/385; G06Q 40/00; G06Q 10/06315; G06Q 20/10; G06Q 20/382; G06Q 20/40145; G06Q 30/02; G06Q 30/0222; G06Q 30/04; G06Q 30/06; G06Q 50/01; G06Q 10/0833; G06Q 20/204; G06Q 20/36; G06Q 20/3672; G06Q 20/38215; G06Q 20/3829; G06Q 20/4012; G06Q 30/0207; G06Q 30/0241; G06Q 30/0601; G06Q 30/0641; G06Q 10/06375; G06Q 10/0832; G06Q 10/087; G06Q 20/02; G06Q 20/085; G06Q 20/1235; G06Q 20/202; G06Q 20/22; G06Q 20/28; G06Q 20/3224; G06Q 20/3278; G06Q 20/367; G06Q 20/3821; G06Q 20/3825; G06Q 20/387; G06Q 20/4014; G06Q 20/4016; G06Q 30/0217; G06Q 30/0239; G06Q 30/0283; G06Q 30/0284; G06Q 30/0633; G06Q 40/02; G06Q 40/025; G06Q 10/00; G06Q 10/025; G06Q 10/06; G06Q 10/06398; G06Q 10/0836; G06Q 10/0837; G06Q 10/0838; G06Q 10/0875; G06Q 10/101; G06Q 10/105; G06Q 10/107; G06Q 10/1091; G06Q 10/1097; G06Q 10/30; G06Q 20/00; G06Q 20/04; G06Q 20/042; G06Q 20/0425; G06Q 20/045; G06Q 20/0453; G06Q 20/0658; G06Q 20/0855; G06Q 20/105; G06Q 20/108; G06Q 20/14; G06Q 20/16; G06Q 20/18; G06Q 20/206; G06Q 20/227; G06Q 20/29; G06Q 20/32; G06Q 20/3223; G06Q 20/3226; G06Q 20/327; G06Q 20/3274; G06Q 20/3276; G06Q 20/341; G06Q 20/3415; G06Q 20/363; G06Q 20/38; G06Q 20/3823; G06Q 20/407; G06Q 20/409; G06Q 20/4097; G06Q 20/425; G06Q 2220/00; G06Q 30/00; G06Q 30/01; G06Q 30/012; G06Q 30/016; G06Q 30/0203; G06Q 30/0205; G06Q 30/0209; G06Q 30/0211; G06Q 30/0214; G06Q 30/0215; G06Q 30/0236; G06Q 30/0251; G06Q 30/0256; G06Q 30/0261; G06Q 30/0278; G06Q 30/0609; G06Q 30/0613; G06Q 30/0623; G06Q 30/0625; G06Q 30/0631; G06Q 30/0635; G06Q 30/0637; G06Q 30/0639; G06Q 30/08; G06Q 40/125; G06Q 50/18; G06Q 50/22; G06Q 50/265; G06Q 50/28; G06Q 50/30; G06Q 20/102; G06Q 10/0833; G06Q 10/06; G06Q 20/227; G06Q 50/22; G06Q 20/027

See application file for complete search history.

(56) References Cited

U.S. PATENT DOCUMENTS

| | | | |
|---|---|---|---|
| 2002/0087968 A1 | 7/2002 | Krishnan et al. | |
| 2002/0128851 A1* | 9/2002 | Chefalas | G06Q 10/10 705/302 |
| 2003/0126094 A1* | 7/2003 | Fisher | G06Q 20/02 705/75 |
| 2007/0183746 A1 | 8/2007 | Haeuser et al. | |
| 2007/0197261 A1* | 8/2007 | Humbel | G06Q 30/00 455/558 |
| 2008/0195506 A1 | 8/2008 | Koretz et al. | |
| 2009/0078760 A1* | 3/2009 | Sherman | G06Q 30/06 235/380 |
| 2009/0089111 A1* | 4/2009 | Walker | G06Q 10/06 705/7.29 |
| 2010/0057619 A1* | 3/2010 | Weller | G06Q 20/02 705/67 |
| 2010/0077017 A1 | 3/2010 | Martinez et al. | |
| 2010/0201536 A1* | 8/2010 | Robertson | G07C 9/00904 340/686.6 |
| 2012/0157079 A1* | 6/2012 | Metivier | G07C 9/00182 455/420 |
| 2012/0188054 A1* | 7/2012 | Bongard | G07C 9/00309 340/5.61 |
| 2012/0239788 A1* | 9/2012 | Amber | H04L 65/1073 709/220 |
| 2013/0073403 A1* | 3/2013 | Tuchman | G06Q 20/20 705/16 |
| 2013/0073690 A1* | 3/2013 | DeSalvo | H04L 67/125 709/219 |
| 2014/0046848 A1 | 2/2014 | Radu et al. | |

OTHER PUBLICATIONS

Communication Pursuant to Article 94(3) EPC, dated 28 Jun. 2017, 6 pp.

* cited by examiner

AUTOMATIC REGISTRATION AND GENERATION OF CONSUMER PAYMENT CREDENTIALS USING INTERNET-CONNECTED APPLIANCES

CROSS REFERENCE TO RELATED APPLICATION

This application is a continuation of U.S. patent application Ser. No. 13/963,141 filed on Aug. 9, 2013, which claims the benefit of and priority to U.S. Provisional Patent Application No. 61/681,929, filed Aug. 10, 2012, which applications are incorporated herein by reference for all purposes.

FIELD OF THE INVENTION

This application generally relates to electronic commerce, and in particular to methods, systems and apparatus for automatically registering cardholders, and for allowing the cardholders to conveniently and securely purchase products and/or services online by using Internet-connected appliances, such as a set-top box (STB).

BACKGROUND OF THE INVENTION

The Internet has changed the way in which consumers shop and purchase products and services. In particular, consumers desire easy access to merchants' offerings and convenient and secure methods of payment for goods and services. It is common for households to have one or more electronic devices connected to the Internet via cable-type modems or DSL-modems and/or routers, which may provide wired or wireless Internet access. For example, many household entertainment devices (e.g., television sets, set-top boxes (STB's), and game consoles) as well as home automation systems and appliances (e.g. refrigerators, security systems and the like) are currently connected to the Internet and configured to receive content for display and/or to obtain information from consumers. Some of these Internet-connected devices (including the DSL modems and/or cable-type modems and/or routers) include ports and/or connectors that can be used to plug in peripheral devices such as a reader device, and some recently manufactured Internet-connected devices include an integrated reader device.

A need exists for systems and methods that facilitate remote purchasing (or other interactions) scenarios for consumers utilizing, for example, an Internet-connected household appliance such as a television or refrigerator, whereby such systems and methods provide for automatically generating consumer credentials (such as consumer payment credentials). There is also a need for systems and methods for setting up a proxy and/or alias locally (for example, at an Internet-connected household device) which removes the need for storing payment card account details (or other financial account details) anywhere outside of a payment system.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments (not necessarily drawn to scale), wherein.

Like reference numbers in the drawings indicate like elements.

DETAILED DESCRIPTION

Figure 1A:
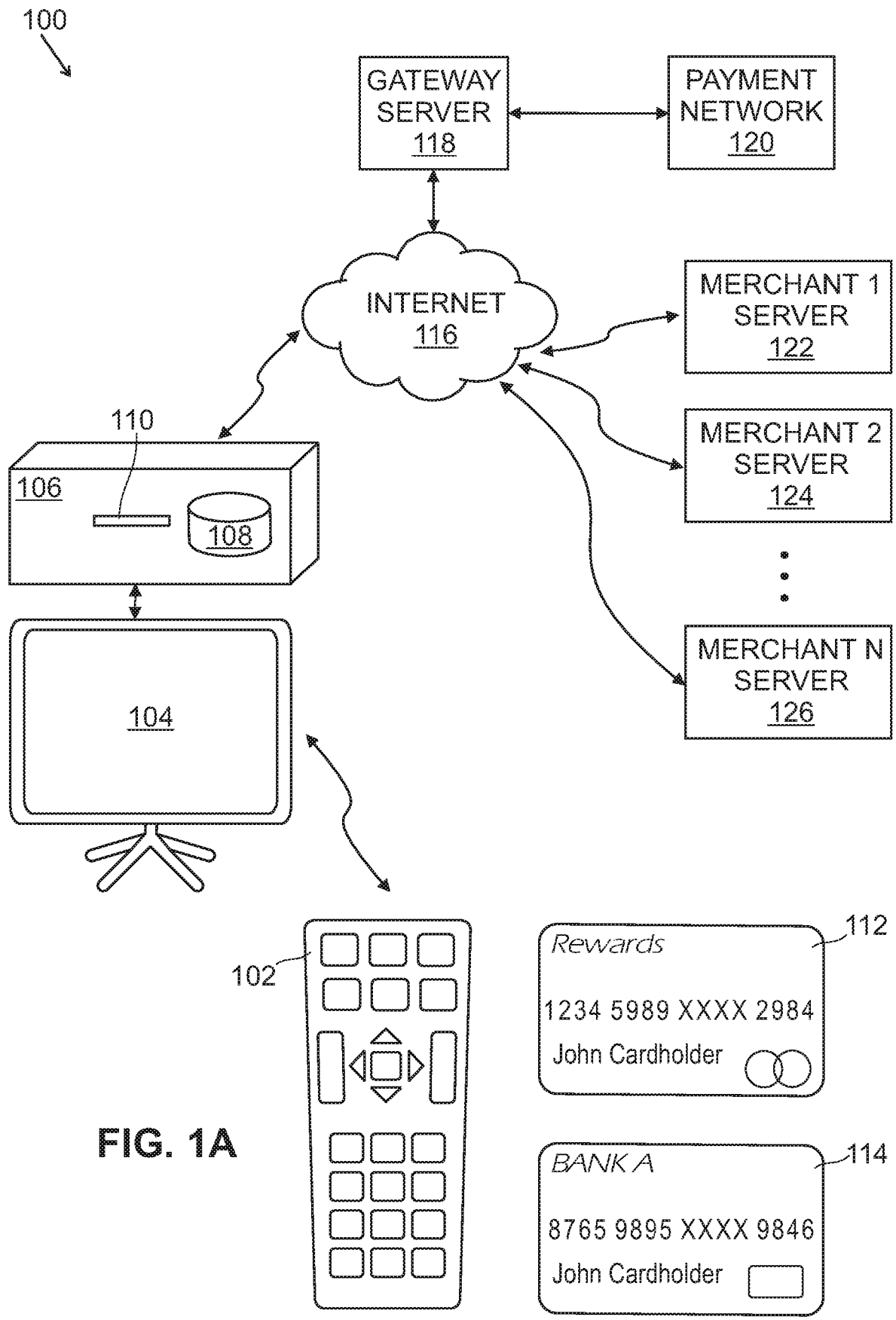
FIG. 1A is a block diagram illustrating an automatic registration and payment system according to an embodiment of the invention.

In general, and for the purpose of introducing concepts of novel embodiments described herein, provided are systems, apparatus and methods for automatically registering and/or lodging payment credentials from an EMV or EMV-like payment card or other payment device into a business or domestic or household Internet-connected appliance. (EMV is a global standard for interoperation of integrated circuit (IC) cards also known as "chip cards" and IC compatible devices for authenticating credit and debit card payments.) Once registered, processes are described for allowing a consumer or cardholder to conveniently and securely purchase products and/or services online by using one or more of his or her Internet-connected appliance(s). Such systems, apparatus and methods can be modified for use in other environments, for example, for use business environments or government environments.

In some embodiments, registration is performed by utilizing an Internet-connected household appliance or device. The household appliance can include an integrated reader or an externally-attached reader, which reader is configured to read the payment credentials of, for example, a payment card via a chip, magnetic stripe, a contactless protocol, near-field communications (NFC), Bluetooth, or infrared (IR) protocol. In some cases, the consumer may manually key-in some or all of the payment credentials by using the household appliance. In some embodiments, the consumer is prompted to execute a Cardholder Verification Method (CVM) (e.g., by entering a PIN or a passcode). After the consumer has registered his or her household appliance and payment account(s), the requisite data is stored locally so that subsequent purchases via that same appliance (for example, from a Set-Top Box (STB) and/or from an Internet-enabled television (TV)) can easily and automatically occur by the consumer (who is, in some embodiments, a payment card account holder or cardholder) simply calling upon the locally stored payment and cardholder credentials. This allows the registered cardholder to avoid having to go through a manual check-out process for online purchase transactions involving the Internet-connected appliance.

In another aspect, systems and methods are described herein for setting up and/or utilizing a proxy or alias locally (for example, at the household appliance) which removes the need for storing payment card account details (or other financial account details) anywhere outside the payment system. In such a system, the proxy could be transmitted for authentication by the payment infrastructure. If it is valid, the proxy is then converted into the original payment account format and the transaction is transmitted to an issuer financial institution for making the authorization decision. In some embodiments, the proxy is linked to the original financial account by a secure server in the payment infrastructure which validates the proxy and converts the transaction to the original financial or payment account. Such a process avoids impacting the issuer of the original payment account while offering security in the sense that a third party is responsible for verifying that the proxy was authenticated as part of the purchase transaction request. Once again, after the consumer has gone through the registration process with his or her household appliance and payment account(s), for subsequent purchases via that same appliance, the cardholder can simply utilize the locally stored payment and cardholder credentials. Such a process allows the consumer to avoid having to go through a manual check-out process when conducting an online purchase using that Internet-connected appliance.

In yet another aspect, described are systems and processes for one or more Internet connected primary appliances (such as a television (TV), set-top box (STB), Cable Modem, household router, and the like) offering a payment capability to other Internet capable and/or Wifi-enabled (or otherwise capable of wireless communication) secondary appliances or devices that are operably connected to a domestic network or to a business network. In implementations of this aspect, a consumer first registers one or more payment accounts by providing his or her payment credentials by following one of the methods described herein, but it should be understood that other mechanisms and/or methods that involve lodging of payment credentials in an Internet-connected appliance could be used. In some embodiments, wireless communications occur between the primary and secondary appliances or devices within a local (domestic or business) network. In a first implementation, a secondary appliance operably connects to a primary appliance (which may be thought of as performing the functions of a payment server) to request the payment credentials (for example, a primary account number (PAN), a CVC, an expiration date, and the like, associated with a payment card account) and associated cryptograms and/or tokens (e.g., an authorization request cryptogram (ARQC), a one-time password (OTP), and the like). Once the payment credentials and cryptogram information is obtained, then the secondary appliance may handle the payment transaction directly by transmitting a purchase request to a payment network, for example. In another implementation, the secondary appliance submits the purchase transaction details (for example, the product name and/or product identifier (such as a SKU), the amount or purchase price, a merchant identifier, and the like) to the primary appliance (for example, a STB functioning as a payment server), and the primary appliance then handles the payment transaction directly with the payment network. In this scenario, the primary appliance generates the payment credentials (e.g., the PAN, the CVC, and the like) and the associated cryptograms and/or tokens; adds this information to the purchase order and/or basket; and submits an authorization request and/or purchase transaction request.

Novel aspects are described herein with regard to a television (TV) (for example, a digital flat-screen television) and/or with regard to a set-top box (STB) and/or with regard to a smart refrigerator in a domestic or private environment. However, it should be understood that the systems and methods are equally applicable in many other types of environments and with many other types of Internet-connected appliances or devices. For example, the systems and methods described herein could be used in a government, public, private, household and/or business environment. Thus, the systems and methods could be modified, for example, to accommodate the hospitality industry that conventionally utilizes an "account number on file" system. In such a hospitality environment, the systems and methods described herein can be advantageously utilized to set up a full-service environment that would minimize security risks and reduce costs associated with processing and protecting sensitive data related to hotel guests, for example. Other examples of business or public environments in which the described methods and systems may advantageously be used include, but are not limited to, vending businesses, parking garage businesses and governmental agencies, such as the department of motor vehicles (DMV). Various other benefits and advantages may be realized and/or become apparent by adapting the systems and methods described herein for use in such public, private, household, business and/or government environments.

Accordingly, embodiments of the systems and methods described herein serve to shift a portion of the processing of data concerning payment account transactions into a combination of a central server and a consumer appliance (such as a set-top box (STB), a television (such as a flat-screen television), a refrigerator, a microwave oven, and the like) to facilitate online payment transactions.

FIG. 1A is a block diagram illustrating an automatic registration and payment system 100 according to an embodiment that allows a consumer to utilize a household Internet-connected appliance to register payment credentials, and then to conveniently select and purchase products and/or services via an online shopping experience. In this example, a consumer utilizes a remote control device 102 to control a TV 104 and/or a set-top box (STB) 106 (the Internet-connected appliance), wherein the STB 106 includes a storage device 108 and a reader 110. The consumer is a cardholder who has a first payment card "Card1" 112 and second payment card "Card2" 114. As shown, the STB 106 is operably connected to the Internet 116, which may be via a cable-type modem or a DSL-type modem or a router (not shown). A gateway server 118 is also operably connected to the Internet 116 and to a payment network 120. The gateway server 118 may be part of the payment infrastructure along with the payment network 120, or may be associated with a third party payment service provider (PSP). Also shown are Merchant1 Server 122, Merchant2 Server 124 and MerchantN Server 126, which are each operably connected to the Internet 116. The merchant servers 122, 124 and 126 represent a plurality or number "N" of different businesses offering a plurality of different products and/or services.

In some embodiments, the consumer or cardholder enters data concerning his payment cards 112 and 114 into the STB 106 by having them read by the integrated reader 110 associated with the STB 106, wherein the reader is mechanically and/or electronically capable of reading EMV-type data. For example, if the payments cards 112 and 114 are proximity payment cards, then the consumer may tap each of the proximity cards near the reader (by tapping each card at a designated location and when prompted to do so during a registration process) to enter data stored within those proximity payment cards. In other embodiments, the reader may be configured to read a magnetic stripe on one or more payment cards (for example, the consumer may be prompted to "swipe" his or her payment card by inserting it into a slot associated with the reader and then removing it). In some embodiments, the reader may be configured to utilize a PayPass™ process (as promulgated by MasterCard International Incorporated), or an NFC-type process or other contactless-type process to read the data from the payment cards. In yet other embodiments, the consumer may be required to utilize the remote control 102 to manually key-in at least a portion of the payment account registration data into the STB 106 by utilizing a keyboard (not shown) provided on a display of the TV 104.

Thus, in some embodiments the reader 110 of the STB 106 reads card data and then the STB generates and transmits an online registration request to the gateway server 118, during which the payment card(s) and/or the cardholder are authenticated. In addition, in some embodiments, the cardholder may be prompted to provide a Personal Identification Number (PIN) or to conduct some other consumer verification method (CVM). For example, the cardholder may provide a PIN by using the keypad of the remote control 102, or provide a fingerprint utilizing a fingerprint scanner (not shown), or provide some other type of biometric data (such as an iris scan) using other devices (not shown). Accordingly, in some embodiments, the TV 104 may include an input device that could be utilized by the consumer to enter information, for example, a separate keypad or the screen of the TV could be a touchscreen that enables data entry. It should be understood that Card1 112 and Card2 114 may have been issued by different issuer financial institutions, and thus, the cardholder may be required to provide or enter different types of data during a registration process that may be dependent on issuer policies or protocols or regulations, and/or may depend on the type of payment card account.

Referring again to FIG. 1A, the registration request is routed to the payment network 120 via the gateway server 118, which payment network includes payment infrastructure (e.g., acquirer server computers and/or issuer server computers and the like, which are not shown) that responds to the registration request. Upon approval, the STB 106 stores the consumer's payment credentials locally in a dedicated storage element 108 (which may be a portion of a hard drive that is housed within the STB 106). The consumer payment credentials that are locally stored may include a Primary Account Number (PAN), a CVC code, an expiration date, the cardholder name and the like data. In some embodiments, the system may prompt the cardholder to choose a passcode or to confirm a parental control passcode. Such operation serves to allow various family members to safely use their individual cards and/or accounts when shopping, as well as control the use of the system by other family members, if so desired. In some embodiments, the STB 106 prompts the cardholder to enter the billing and/or shipping address details which data are then stored in the same dedicated storage element or dedicated storage location in the local storage device 108 to enable a completely automatic check-out process. In some other embodiments, the STB 106 prompts the cardholder to register additional payment cards, which may follow the method explained above. In this case, the STB may function to prompt the cardholder to confirm the previously entered billing and/or shipping address details that have already been entered, rather than require re-entry of such data for each payment account.

In some embodiments, the STB 106 and television 104 enables the cardholder to browse and/or review his or her list of registered payment cards (which may include credit card accounts, debit card accounts and/or pre-paid card accounts), and also may enable the consumer to select one or more preference settings for his or her payment card accounts. For example, Card1 112 may be set as the default payment card account that will be utilized for most online purchase transactions, and Card2 114 may be set as the payment card account that is to be used when ordering food online from a restaurant. In addition, the STB 106 may enable the cardholder to delete, add, and/or change preferential ordering of the payment card account data in the dedicated storage element.

Figure 1B:
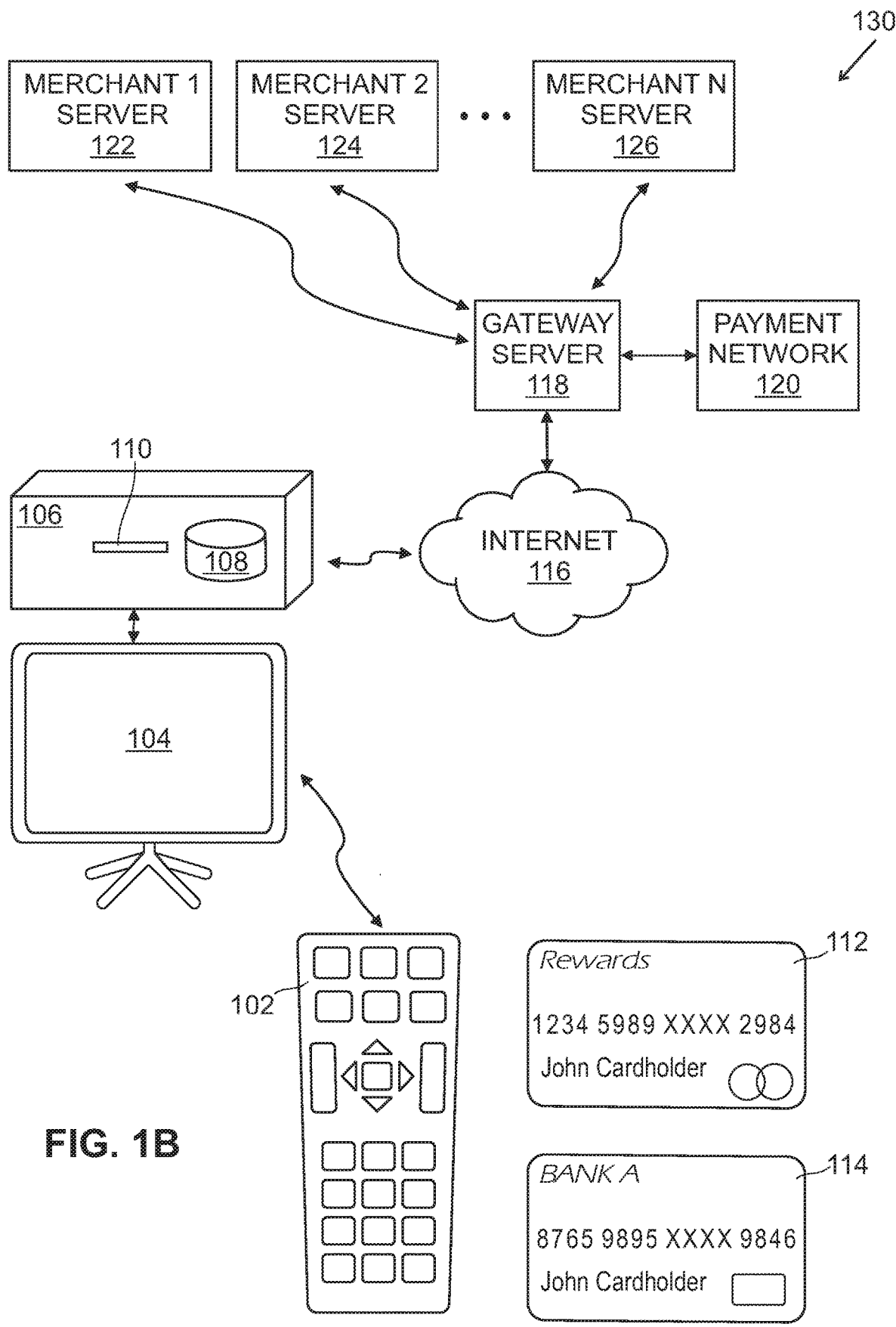
FIG. 1B is a block diagram illustrating another embodiment of an automatic registration and payment system according to the invention.

FIG. 1B is a block diagram illustrating another embodiment of an automatic registration and payment system 130 according to an embodiment, which is similar to that of FIG. 1A. In particular, the system 130 also allows a consumer to utilize a household Internet-connected device to register payment credentials, and then to conveniently select and purchase products and/or services via an online shopping experience. Once again, the consumer (who is a cardholder who has a first payment card "Card1" 112 and second payment card "Card2" 114) utilizes the remote control device 102 to control the TV 104 and/or the STB 106, wherein the STB 106 includes a storage device 108 and a reader 110. As shown, the STB 106 is operably connected to the Internet 116, which may be via a cable-type modem or a DSL-type modem or a router (not shown), and the gateway server 118 is also operably connected to the Internet 116. In the system 130, the gateway server 118 is operably connected to payment network 120 and to each of the merchant servers 122, 124 and 126, which represent a plurality or number "N" of different businesses offering a plurality of different products and/or services. As mentioned above, the gateway server 118 may be part of the payment infrastructure along with the payment network 120, or may be associated with a third party payment service provider (PSP).

In order to register, the consumer (cardholder) enters data concerning his payment cards 112 and 114 into the STB 106 by tapping each of them onto the vicinity of the integrated reader 110 (which is mechanically and/or electronically capable of reading EMV-type data). As mentioned above, in some implementations the reader may be configured to read a magnetic stripe on one or more payment cards (for example, the consumer may be prompted to "swipe" his or her payment card by inserting it into a slot associated with the reader and then quickly removing the card). In some other embodiments, the reader may be configured to utilize a PayPass™ or NFC-type process or other contact or contactless-type process to read the data from the payment cards. In yet other embodiments, the consumer may be required to utilize the remote control 102 to manually key-in payment account registration data into the STB 106.

Therefore, in this example the reader 110 of the STB 106 reads card data and then the STB generates and transmits an online registration request to the gateway server 118, via the Internet 116, during which time the payment card(s) and/or the cardholder are authenticated. In some implementations, the cardholder is prompted for a Personal Identification Number (PIN) or to conduct another type of CVM. For example, he or she may enter via a PIN via a keypad on the remote control 102. (In some embodiments, the TV may include an input device that could be utilized by the consumer to enter information, for example, the screen of the television could be a touchscreen that enables data entry.) It should be understood that Card1 112 and Card2 114 may have been issued by different issuer financial institutions, and thus the cardholder may be required to provide or enter different types of data during a registration process that may be dependent on issuer policies or protocols or regulations, and/or may depend on the type of payment card account.

The registration request is routed to the payment network 120 via the gateway server 118, which network includes payment infrastructure (e.g., acquirer server computers and/or issuer server computers and the like, which are not shown) that responds to the registration request. Upon approval, the STB 106 stores the consumer's payment credentials locally in a dedicated storage element 108 (such as a portion of a hard drive that is housed within the STB 106). The consumer payment credentials that are locally stored may include a Primary Account Number (PAN), a CVC code, an expiration date, the cardholder name and the like data. In some embodiments, the system may prompt the cardholder to choose a passcode or to confirm a parental control passcode. Thus, various family members can safely use the STB and their individual cards and/or accounts when shopping, as well as control the use of the system by other family members, if so desired. In some embodiments, the STB 106 prompts the cardholder to enter the billing and/or shipping, address details which are then stored in the same dedicated storage element of the local storage device 108 to enable a completely automatic check-out process. In some other implementations, the STB 106 prompts the cardholder to register additional payment cards, which may follow the method explained above. In this case, the STB may function to prompt the cardholder to confirm the previously-entered billing and/or shipping address details that have already been entered, rather than require re-entry of such data for each payment account.

As also mentioned above, the STB 106 and television 104 may enable the cardholder to browse and/or review his or her list of registered payment cards (which may include credit card accounts, debit card accounts and/or pre-paid card accounts), and also may enable the consumer to select one or more preference settings for his or her payment card accounts. For example, the consumer may be permitted to set Card1 112 as the default payment card account for use in most online purchase transactions, and to set Card2 114 as the payment card account that is to be used when ordering food online from a restaurant. In addition, the STB 106 may enable the cardholder to delete, add, and/or change preferential ordering of the payment card account data in the dedicated storage element.

Figure 1C:
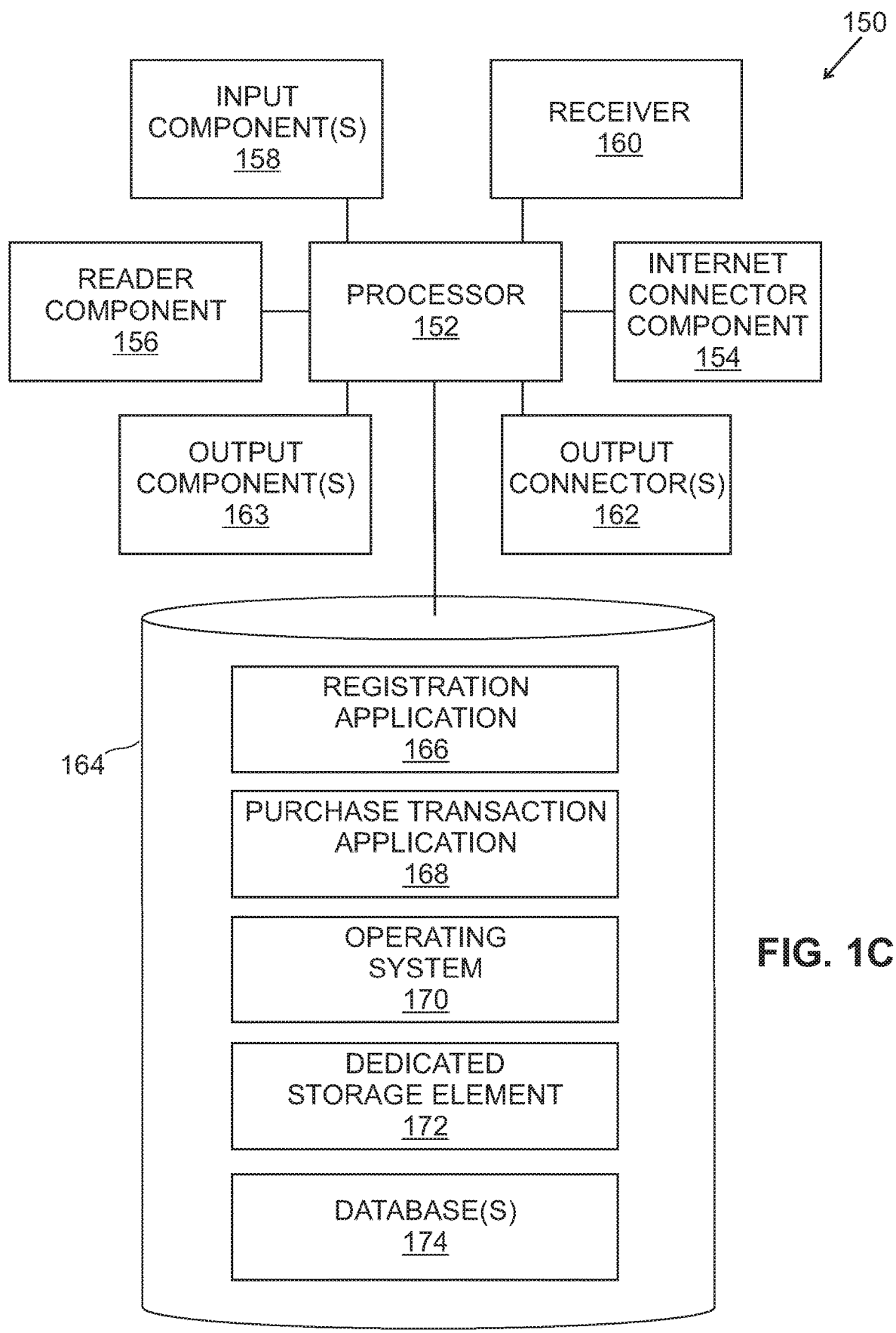
FIG. 1C is a block diagram of an Internet-connected appliance in accordance with an embodiment of the invention.

FIG. 1C is a block diagram of an embodiment of a household or business Internet-connected appliance 150, such as the set-top box (STB) 106 of FIGS. 1A and 1B. The Internet-connected appliance or device may include conventional components in its hardware aspects, but may be controlled by software to cause it to operate in accordance with aspects of the methods presented herein. In particular, the Internet-connected appliance may include a computer processor 152 operatively coupled to an Internet connector component 154, a reader component 156, one or more input components 158, a receiver 160, one or more output connectors 162, one or more output component(s) 163, and a storage device 164. Examples of Internet-connected appliances include, but are not limited to, a STB, a flat-panel television, a microwave oven, a refrigerator, a thermostat, and the like, which may be household devices and/or business devices.

The computer processor 152 may constitute one or more conventional processors. Processor 152 operates to execute processor-executable steps, contained in program instructions described herein, so as to control the Internet-connected device 150 to provide desired functionality.

Internet connector component 154 may be used to facilitate wired or wireless communication with, for example, other devices, such as a router or cable modem. The Internet connector component 154 may also, for example, have capabilities to permit data communications over the Internet and/or via conventional computer-to-computer data networks, and such data communications may be in digital form and/or in analog form.

The reader component 156 may be a magnetic stripe reader, an NFC-type reader, another type of proximity reader, or any other type of reader that is mechanically and/or electronically capable of reading EMV-type data. Thus, the reader component may include a slot (not shown) for inserting a magnetic stripe payment card so that it can be read, and/or may include a surface or area that a cardholder utilizes to tap his or her proximity payment device or to bring his or her proximity payment device nearby in order to communicate information.

The input component(s) or input device(s) 158 may comprise one or more of any type of peripheral device typically used to input data. For example, the input device 158 may include a keypad and/or a touchpad or touchscreen that may be used, for example, by a cardholder for inputting cardholder data, or a PIN, or to input other information.

The receiver 160 may be operable or configured to receive data and/or instructions from, for example, a remote control device (not shown). The receiver may receive, for example, cardholder information, a PIN, and/or a selection of goods or services. The output connector(s) 162 may be configured to connect the Internet-connected appliance to, for example, a flat screen display (such as a flat screen television) or some other peripheral output device such as a printer to provide desired functionality. The output component(s) may include visual and/or audio components, such as an LCD screen, LED screen and/or audio speaker(s) configured to provide information, for example, to a cardholder.

Storage device 164 may comprise any appropriate information storage device, including combinations of magnetic storage devices (e.g., magnetic tape and/or hard disk drives), optical storage devices such as CDs and/or DVDs, and/or semiconductor memory devices such as Random Access Memory (RAM) devices and Read Only Memory (ROM) devices, solid state drive (SSD) devices, and/or flash memory devices. Any one or more of the listed storage devices may be referred to as a "memory", "storage", a "storage medium", or a "computer readable medium." In addition, the storage devices are configurable and/or capable of storing instructions, code and/or data, including instructions configured to cause the processor 152 to execute one or more of the processes described herein. Thus, the storage device 164 stores one or more programs for controlling the processor 152, and the programs comprise program instructions that contain processor-executable process steps of the Internet-connected device 150, including, in some cases, process steps that constitute processes provided in accordance with principles of the processes presented herein.

The application programs stored in the storage device 164 may include a registration or enrollment application 166 that manages processes by which cardholders register or enroll one or more of their payment accounts (such as credit card accounts and/or debit card accounts) with a payment system in accordance with the processes disclosed herein. For example, the registration program may prompt a cardholder to enter data concerning his payment card accounts by having them read from, for example, one or more payment devices by the reader component 156. In some embodiments, the cardholder may be prompted to enter cardholder data by using one or more input devices 158 to manually key-in at least a portion of the payment account registration data, and/or to provide a password, or a PIN, or biometric data (for example, a fingerprint or retina scan) in accordance with one or more CVM requirements.

The storage device 164 also stores a purchase transaction application 168, an operating system 170, dedicated storage element 172, and one or more databases 174. The purchase transaction application 168 is configured to control the processor 152 to conduct purchase transactions in accordance with the methods described herein. The stored operating system 170 may include device drivers, database management software, web software, and the like, and is configured to allow the Internet-connected device 150 to function as described herein. In addition, the dedicated storage element 172, which may be a secure storage area within the storage device, may be utilized to store cardholder credentials in a secure manner. Lastly, the storage device 164 may include one or more databases 174 that are maintained by the Internet-connected device 150, which may include, for example, a merchant database and a cable television provider database.

The application programs of the Internet-connected device 150, as described above, may be combined in some embodiments, as convenient, into one, two or more application programs.

Figure 2A:
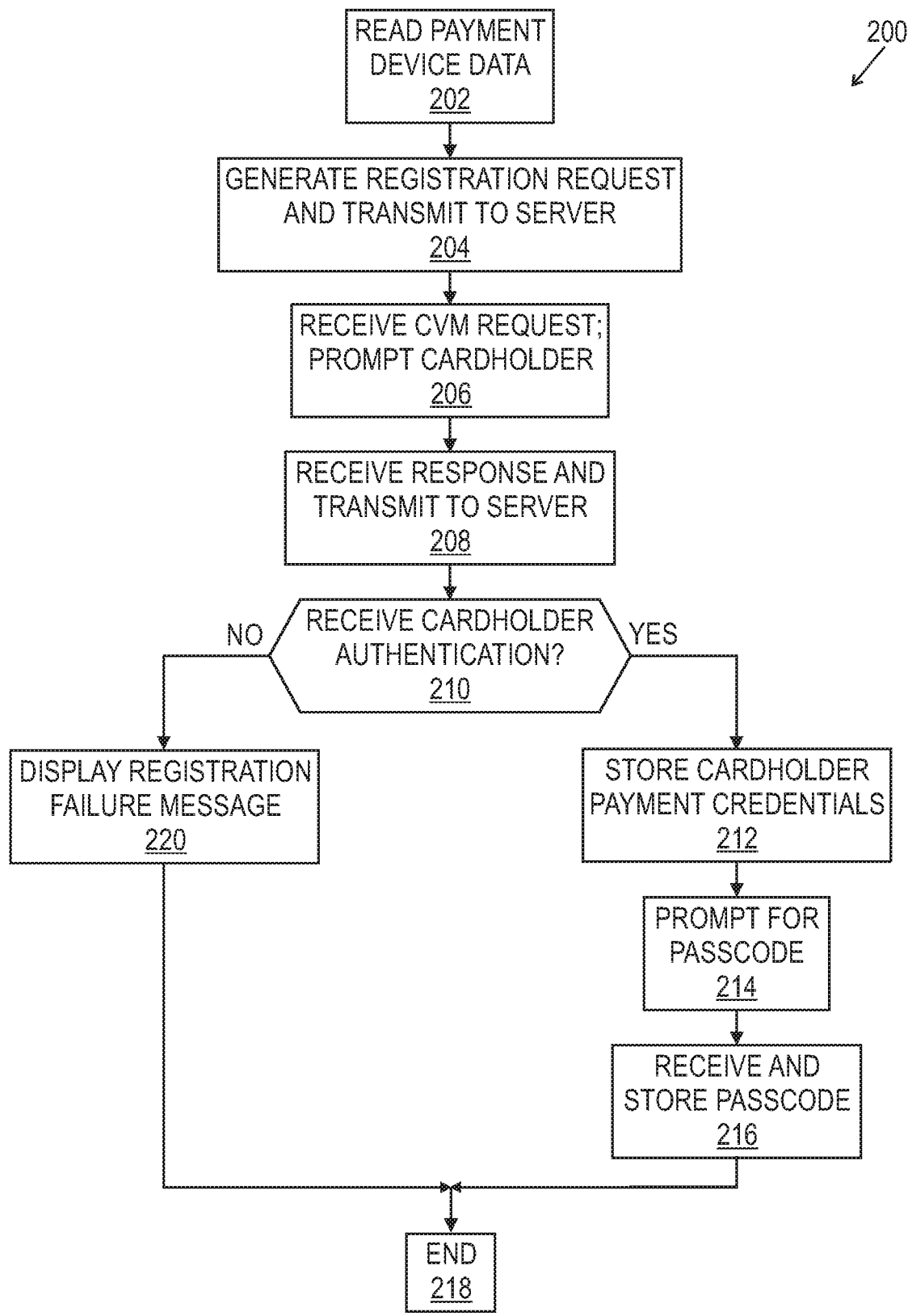
FIG. 2A is a flowchart illustrating a cardholder registration process in accordance with the invention.

FIG. 2A is a flowchart 200 illustrating a cardholder registration process in accordance with some embodiments. For example, a cardholder may utilize an Internet-connected device of the system 100 of FIG. 1A or the system 130 of FIG. 1B to register one or more payment card accounts. In particular, an Internet-connected device (such as a STB, a flat-screen television, a refrigerator or microwave or other kitchen appliance, and the like) reads 202 payment device data (such as a payment card account number, an expiration date, a CVC code, a cardholder name, and the like) from one or more payment devices (such as a payment enabled telephone, a proximity card, a magnetic stripe card, and the like). A registration application of the Internet-connected device recognizes that the consumer has not yet registered with the automatic payment credential system, and thus generates 204 a registration request and transmits the registration request to a gateway server for processing. The gateway server processes the data in the registration request (which includes the cardholder's payment device data), in some embodiments, by contacting one or more issuer financial institutions (FIs) to confirm that the payment account(s) of the consumer are active and/or are eligible for use in the system. If all is in order, in some embodiments the Internet-connected device then receives 206 a cardholder verification method (CVM) request and prompts the cardholder to provide the requisite response (such as entry of a PIN), which the cardholder had previously set up with his or her issuer financial institution. The cardholder may provide the requisite response by, for example, using a touchpad connected to the Internet-connected device, and the Internet-connected device then transmits 208 the cardholder's response to the gateway server. If all is in order (for example, the transmitted PIN was correct to authenticate the cardholder), then in step 210 cardholder authentication was received, and the Internet-connected device stores 212 the cardholder's payment credentials in dedicated storage. In some embodiments, the Internet-connected device prompts 214 the cardholder to enter a passcode for future purchases (which may be used by parents, for example, to control purchases by their children from household Internet-connected devices). The Internet-connected device then receives 216 and stores the passcode, and the process then ends 218. For future purchase transactions from the Internet-connected device (as described below), the cardholder will be required to enter only his or her passcode to consummate a purchase transaction.

Referring again to FIG. 2A, if in step 210 the cardholder was not authenticated, then the Internet-connected device displays 220 a registration failure message (which may include a suggestion to re-apply). The process then ends 218.

Thus, the consumer registers one or more payment accounts with the system, and payment account data and other data is stored locally, for example, in a secure location or dedicated storage element of the storage device 108 of the STB 106 of FIGS. 1A and 1B (or the dedicated storage element 172 of the Internet-connected device 150 shown in FIG. 1C). Thus, in an implementation the consumer may utilize the remote control 102 with the STB 106 to view images of products and/or services (not shown) offered on a merchant website and displayed on the display screen of the TV 104. In some embodiments, a cable-TV provider may provide a "virtual mall" composed of icons for viewing on the TV and for selection by the consumer (not shown), which enables a plurality of merchants to offer various products and services that the consumer may choose to purchase. For example, offerings may include local goods and/or services, food for delivery and/or to take-out. The cable-TV provider may also offer pay-per view programs, viewer value packs and/or short-term viewing subscriptions for purchase by the consumer. In some embodiments, the virtual mall has a modular-type structure with icons or placeholders representing different types of goods and/or services. For example, a digital media icon may be provided that represents music, games, and gambling services, and it may be displayed near or next to a direct response shopping icon that represents programs, commercials and infomercials. When an icon is selected, that particular icon may vanish and be replaced by a plurality of different icons that each represent, for example, a different merchant offering in a particular category (for example, "fast food takeout" choices), for viewing on the TV screen and selection by the consumer.

Figure 2B:
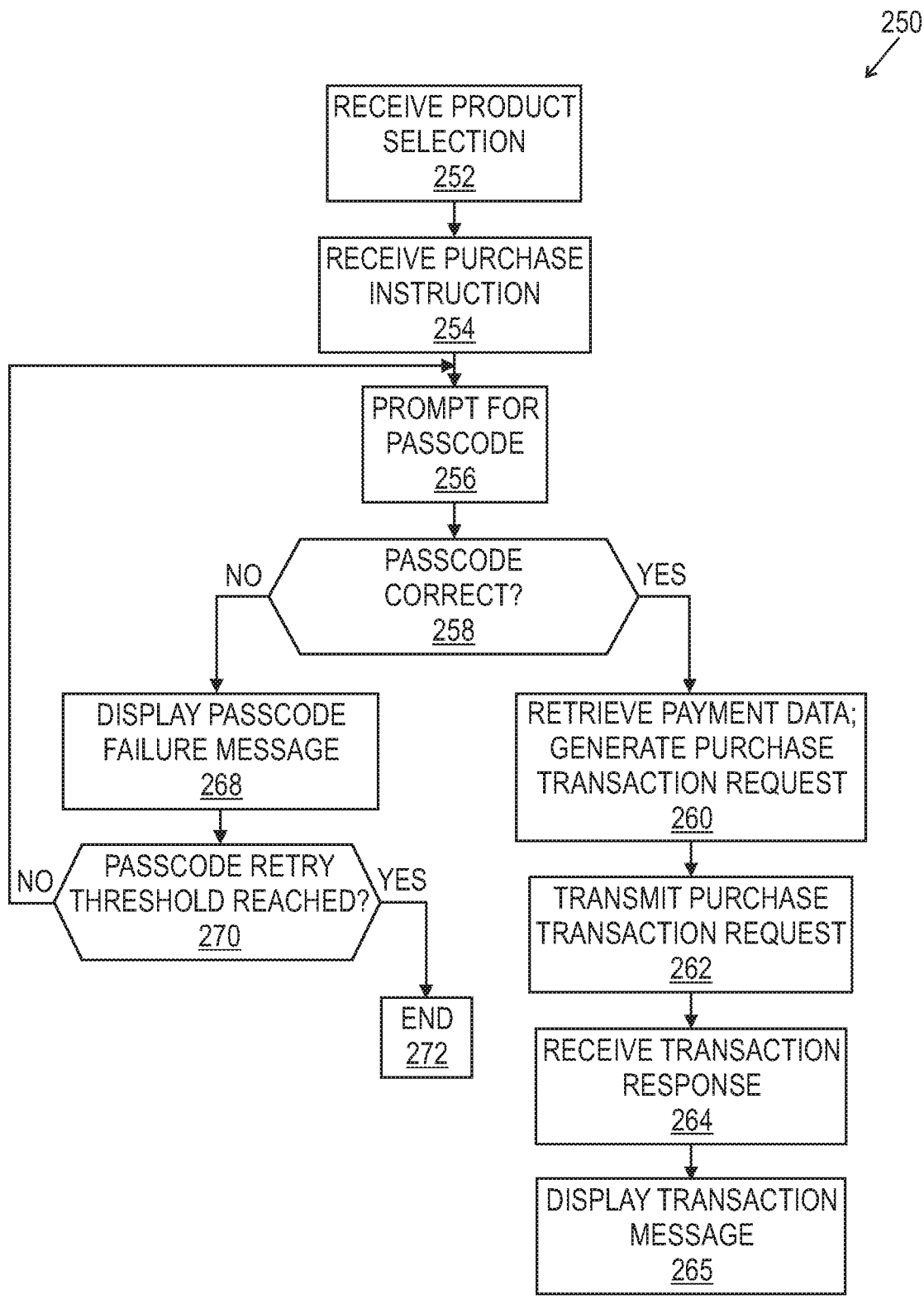
FIG. 2B is a flowchart illustrating a cardholder transaction process according to an embodiment of the invention.

FIG. 2B is a flowchart illustrating a cardholder transaction process 250 utilizing the system 100 of FIG. 1A and/or the system 130 of FIG. 1B in accordance with embodiments described herein. In an implementation, a STB receives 252 a selection (for example, from a consumer utilizing a remote control device) of a product or service, such as an order for a pizza delivery, and then receives 254 a purchase instruction or indication. In some embodiments, the STB 106 recalls the cardholder's stored payment credentials and billing address details for each payment card account that has been registered and stored locally (which may be multiple payment cards) and that are available for cardholder selection as the means of payment. The consumer or cardholder makes a choice of payment card account (not shown) and, in some embodiments is then prompted 256 to enter his or her unique PIN or passcode before confirming transaction completion. In some embodiments, the consumer indicated a default payment card account designated for use in such transactions during enrollment, and in this case the process does not include a payment card selection by the cardholder.

Referring again to FIG. 2B, the STB next prompts 256 the cardholder to enter his or her passcode, and if the passcode is correct 258 then the STB retrieves 260 payment data and generates a purchase transaction request. The STB 106 then transmits 262 the consumer's purchase transaction request via the Internet 116 to the gateway server 118 where it is routed to the payment network 120 and routed to the relevant card issuer. In some embodiments, the payment network 120 may include a multiplicity of server computers including the gateway server 118 and a plurality of issuer financial server computers (not shown) that operate in a substantially conventional manner to identify and authorize payment card account transactions, and may also include acquirer server computers (not shown) associated with the merchants for receiving payments. In addition, in some implementations the order for the pizza delivery is routed via the Internet 116 to a local merchant server 124 for fulfillment after the payment request has been authorized.

With regard to the purchase transaction request, if all is in order (which may mean that the cardholder has adequate funds and/or credit associated with the payment account to pay for the transaction, and that the PIN and/or other CVM data transmitted with the purchase transaction request matches the PIN and/or other CVM data on file for that payment card account) then the payment network 120 authorizes the purchase transaction and generates an authorization response and/or favorable transaction response for transmission by the gateway server 118. Thus, in some embodiments, the STB 106 receives 264 a transaction response message from the gateway server and then displays 265 a transaction message to the consumer that indicates either that the purchase transaction was authorized or that it was denied. In some implementations, the gateway server 118 may also transmit the purchase transaction request and the authorization response to the appropriate merchant server, such as the merchant server 124, for example (which is associated with "Joe's Pizza Place", for example) so that that merchant can be aware of the pizza order, fulfill the order and be paid for the pizza (the ordered item). In the system 100 of FIG. 1A, the gateway server 118 would transmit the transaction request and the authorization response via the Internet 116 to the appropriate merchant server. In the system 130 of FIG. 1B, the gateway server 118 is operably connected to each of the merchant servers 122, 124 and 126 and thus, would directly transmit the purchase transaction request and the authorization response to the appropriate merchant server for order and payment processing.

Referring again to FIG. 2B, if in step 258 the passcode entered by the consumer was incorrect, then the STB displays 268 a passcode error message to the consumer and determines 270 whether or not a passcode retry threshold has been reached. If the passcode retry threshold has been reached, then the process ends 272. However, if the retry threshold has not been reached, then the process branches back and the STB prompts 256 the consumer again for his or her passcode. The passcode retry threshold may be set, for example, to allow three entries before ending the process, and ending the process under these circumstances may include displaying an initial webpage of a merchant or an initial shopping display screen (but in any case, it will be clear to the consumer that the purchase transaction was not consummated).

It should also be understood that, with regard to FIGS. 1A and 1B, as part of the registration process and/or purchase transaction process, the location of and/or an identifier associated with the consumer's household device (such as the STB 106 or TV 104) may also be transmitted to the gateway server 118 for association with the payment account information, which can add an additional layer of security to the system. For example, the consumer's cable provider may associate a unique serial number to each STB in their cable system so that, in some embodiments, that unique STB identifier could be an indication of the origin (a consumer's home and/or household device) of a purchase transaction request. The unique STB identifier thus provides an additional data point that raises the confidence level for an issuer that a purchase transaction request originated from a particular consumer (cardholder) and/or a particular consumer Internet-connected device. In some embodiments, instead of a unique serial number, the internet protocol (IP) address of the consumer's device could be used as an indication of the location of the consumer's household device and/or origin of a purchase request. Such operation is advantageous from a security standpoint because it is relatively easy to obtain and utilize such a unique serial number and/or IP address, the use of such an identifier is transparent to the consumer, and such operation increases the confidence level that the purchase transaction was initiated by the consumer associated with the payment account.

Figure 3A:
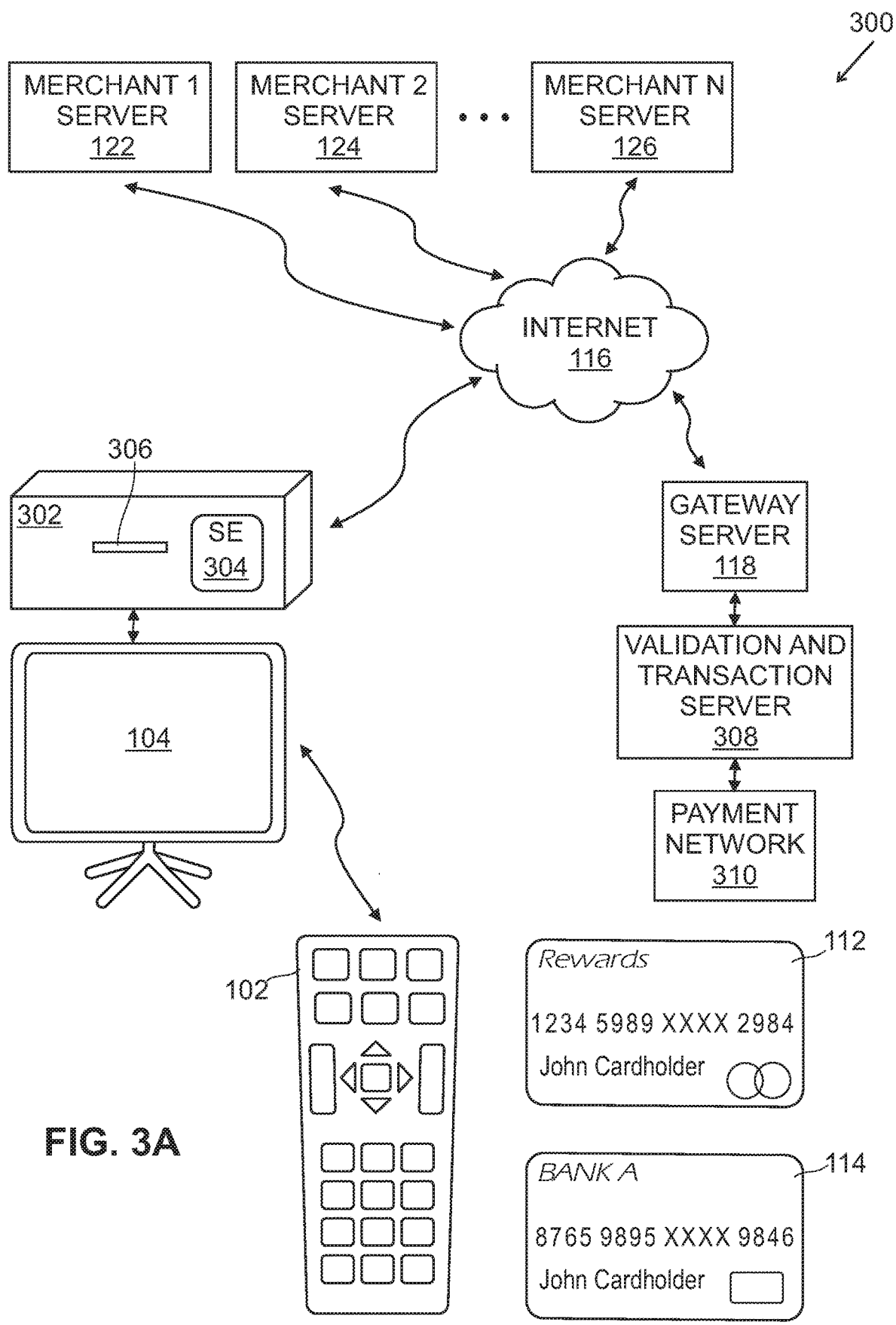
FIG. 3A is block diagram illustrating a payment credential proxy registration and payment system according to an embodiment of the invention.

FIG. 3A is block diagram illustrating a payment credential proxy registration and payment system 300 that allows a consumer to utilize an Internet-connected device to register proxy payment credentials, and conveniently select and purchase products and/or services via a secure online shopping experience. In this example, a consumer utilizes a remote control device 102 to control a TV 104 and/or a STB 302, wherein the STB 302 includes a secure element (SE) 304 and a reader 306. The SE 304 may be a secure storage location of a storage device (such as a secure partition of a hard drive) or may be a separate storage device that is integrated within the STB 302 (and in some embodiments, may be integrated within the TV 104). Alternately, the SE 304 may be in the form of a SIM card, USB dongle, SD card, micro-SD card, and the like form factor that may be operably connected to the STB 302 or TV 104. In any case, the SE 304 is configured for locally and securely storing payment account data read by the reader 306, and in some embodiments for locally and securely storing manually-entered payment account data.

The automatic registration and payment system 300 permits simple payment transactions (and other forms of transactions and/or interactions) to be easily and securely processed against a financial account, via a proxy or alias set up during a registration process. In particular, a secure server links the proxy to the original financial or payment account in the payment infrastructure that functions to validate the proxy when required, and the secure server is also operable to convert a received proxy associated with a given purchase transaction to the original financial account. Such processing avoids any impact on the account issuer and offers enhanced security because, in some embodiments, a third party verifies and/or authenticates the proxy as part of the transaction request (which will be described below).

Referring again to FIG. 3A, in this example the cardholder has two payment accounts with the first associated with a first payment card "Card1" 112 and the second associated with a second payment card "Card2" 114. As shown, the STB 302 is operably connected to the Internet 116, which may be via a cable-type modem or a DSL-type modem or a router (not shown). A gateway server 118 is also operably connected to the Internet 116 and to a validation and translation server 308, which in turn is operably connected to a payment network 310. The gateway server 118, validation and translation server 308 and the payment network 310 may each be components of the payment infrastructure. However, in some embodiments, the gateway server 118 and/or the validation and translation server 308 are associated with a third party services provider. FIG. 3A also depicts Merchant1 Server 122, Merchant2 Server 124 and MerchantN Server 126, which represent a multiplicity of merchant servers, all operably connected to the Internet 116. These merchant servers may each represent different businesses and/or retailers offering a plurality of different products and/or services.

In some embodiments, to register his or her financial accounts the consumer or cardholder presents the payment cards 112 and 114 to the card reader 306 of the STB 106 for reading. In some implementations, the integrated reader 306 is mechanically and/or electronically capable of reading EMV-type data from the cards 112 and 114. If the payments cards 112 and 114 are proximity payment cards, then the consumer may tap each of them near the reader 306 (at a designated location and when prompted to do so during a registration process) to obtain data stored within those proximity payment cards. In other embodiments, the reader 306 may be configured to read a magnetic stripe on one or more payment cards, or be configured to utilize a PayPass™ or NFC-type protocol to read the data from the payment cards. Thus, the reader 306 of the STB 302 reads payment card data (or other payments means data) that includes, for example, a PAN, an authorization request cryptogram (ARQC) (or similar cryptographic element), and also reads a proxy element (an alias) from the payment card. In some embodiments, the consumer may be required to utilize the remote control 102 to manually key at least some portion of the payment account registration data into the STB 302, such as a billing address. The STB 302 then generates and transmits an online registration request via the Internet 116 to the payment infrastructure, which includes the validation and translation server 308, and the registration request includes all details of the payment card(s) account(s) and the proxy data.

In some embodiments, the proxy is initially generated by an entity such as a cable operator, television manufacturer or a payments processing provider. In such cases, a separate validation server (not shown) may be provided as a validation service by the entity that assigned the proxy to the consumer's device. Such a proxy may be derived from (or consist of) an attribute or characteristic that is built-in or associated with the consumer's Internet-connected appliance, such as a unit serial number (which may include both numbers and letters), an internet-protocol (IP) address, a model-type number, a manufacturing date, or combination of such elements, and the like. The proxy may also be derived from an attribute or characteristic of the consumer's primary account number (PAN) in association with one or more characteristics or attributes of the Internet-connected appliance. In addition, in some embodiments, the proxy may be created by an entity in a manner that guarantees that it is a unique identifier (which may be alphanumeric), for example, by use of a random number generator and/or by using a check process (to ensure that such a proxy does not already exist), and/or some other type of process to ensure uniqueness.

The gateway server 118 may be a central server, and it may function to route registration and/or transaction requests to the validation and translation server 308. The validation and translation server 308 may function to authenticate the proxy data and to translate and/or map it to an actual payment card account, for example, and to transmit that information and an authentication request to an issuer server (not shown) associated with the payment card issuer (financial institution) that issued that particular payment account (for example, the issuer of Card1 112). In some embodiments, the validation and translation server 308 is operated by a third party entity such as a payment service provider (PSP), or an electronic payment network, such as the one operated by MasterCard International Incorporated, as part of the payment infrastructure. Upon approval (for example, validation by both the validation and translation server and an issuer server), the payment credentials (including the payment account data and the proxy data) are securely stored, for example, in a database of the validation and translation server 308 and/or by the gateway server 118 for use in future transactions. A response is then transmitted to the STB 302 and/or TV 104 regarding the successful registration of the payment card account.

In some embodiments, the system may prompt the cardholder to choose a passcode or to confirm a parental control passcode. Such operation serves to allow various family members to safely use their individual cards and/or accounts when shopping, as well as control the use of the system by other family members, if so desired. In some embodiments, the STB 302 prompts the cardholder to enter the billing and/or shipping address details that are then stored in a dedicated storage element of a local storage device which may be the SE 304 to enable a completely automatic check-out process. In some other embodiments, the STB 302 prompts the cardholder to register additional payment cards, which follow the method explained above. In this case, the STB 302 may function to prompt the cardholder to confirm the previously entered billing and/or shipping address details that have already been entered, rather than require re-entry of such data.

In some embodiments, the STB 302 and TV 104 enables the cardholder to browse and/or review his or her list of registered payment cards (which may include credit card accounts, debit card accounts and/or pre-paid card accounts), and also may enable the consumer to select one or more preference settings for his or her payment card accounts. For example, Card1 112 may be set as the default payment card account that will be utilized for most online purchase transactions, and Card2 114 may be set up as the payment card account that is to be used when ordering food online from a restaurant. In addition, the STB 302 may enable the cardholder to delete, add, and/or change preferential ordering of the payment card data in the SE 304.

Figure 3B:
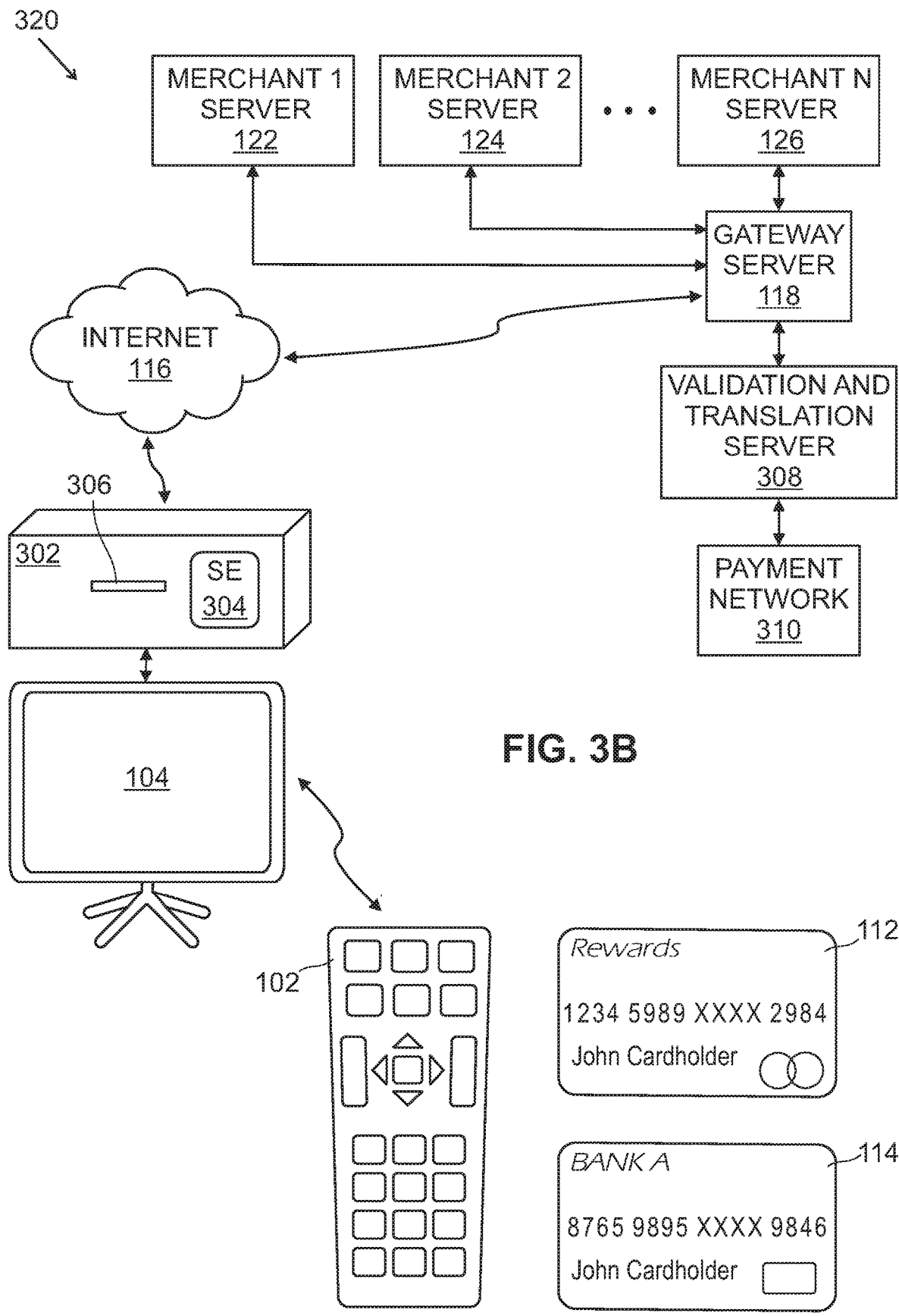
FIG. 3B is block diagram illustrating another embodiment of a payment credential proxy registration and payment system according to the invention.

FIG. 3B is block diagram illustrating a payment credential proxy registration and payment system 320 that is similar to that of FIG. 3A. In particular, the system 320 also allows a consumer to utilize a domestic Internet-connected device to register payment credentials, and then to conveniently select and purchase products and/or services via an online shopping experience. Once again, a consumer utilizes a remote control device 102 to control a TV 104 and/or a STB 302, wherein the STB 302 includes a secure element (SE) 304 and a reader 306. The SE 304 may be a secure storage location of a storage device (such as a secure partition of a hard drive) or may be a separate storage device that is integrated within the STB 302 (and in some embodiments, may be integrated within the television 104).

Alternately, the SE 304 may be in the form of a SIM card, USB dongle, SD card, micro-SD card, and the like form factor that may be operably connected to the STB 302 or TV 104. In any case, the SE 304 is configured for locally and securely storing payment account data read by the reader 306, and in some embodiments for locally and securely storing manually-entered payment account data.

Like the system 300, the automatic registration and payment system 320 permits simple payment transactions (and other forms of transactions and/or interactions) to be easily and securely processed against a financial account, via a proxy or alias set up during a registration process. In particular, a secure server links the proxy to the original payment account in the payment infrastructure that functions to validate the proxy when required, and the secure server is also operable to convert a received proxy associated with a given transaction to the original financial account. Such processing avoids any impact on the account issuer and offers enhanced security because, in some embodiments, a third party verifies and/or authenticates the proxy as part of the transaction request (which will be described below).

In the system 320, the cardholder has two payment accounts with the first associated with a first payment card "Card1" 112 and the second associated with a second payment card "Card2" 114. As shown, the STB 302 is operably connected to the Internet 116, which may be via a cable-type modem or a DSL-type modem or a router (not shown). A gateway server 118 is also operably connected to the Internet 116 and to a validation and translation server 308, which in turn is operably connected to a payment network 310. The gateway server 118, validation and translation server 308 and the payment network 310 may each be components of the payment infrastructure. However, in some embodiments the gateway server 118 and/or the validation and translation server 308 are associated with a third party services provider. FIG. 3B also depicts Merchant1 Server 122, Merchant2 Server 124 and MerchantN Server 126, which represent a multiplicity "N" of merchant servers, all operably connected to the gateway server 118. These merchant servers may represent different businesses and/or retailers offering a plurality of different products and/or services.

In some embodiments, to register his or her financial accounts the consumer or cardholder presents the payment cards 112 and 114 to the reader 304 of the STB 106 for reading. In some implementations, the integrated reader 304 is mechanically and/or electronically capable of reading EMV-type data from the cards 112 and 114. If the payments cards 112 and 114 are proximity payment cards, then the consumer may tap each of them near the reader 304 (at a designated location and when prompted to do so during a registration process) to obtain data stored within those proximity payment cards. In other embodiments, the reader may be configured to read a magnetic stripe on one or more payment cards, or be configured to utilize a PayPass™ or NFC-type protocol to read the data from the payment cards. Thus, the reader 304 of the STB 302 reads payment card data (or other payments means data) that includes, for example, a PAN, an authorization request cryptogram (ARQC) (or similar cryptographic element), and also reads a proxy element (an alias) from the payment card. In some embodiments, the consumer may be required to utilize the remote control 102 to manually key at least some portion of the payment account registration data into the STB 302, such as a billing address. The STB 302 then generates and transmits an online registration request via the Internet 116 to the gateway server 118, which then communicates with validation and translation server 308 and payment network 310. The registration request includes all details of the payment card(s) account(s) and the proxy data.

In some embodiments, the proxy is initially generated by an entity such as a cable operator, television manufacturer or a payments processing provider. In such cases, a separate validation server (not shown) may be provided as a validation service by the entity that assigned the proxy to the consumer's device. Such a proxy may be derived from (or consist of) an attribute or characteristic that is built-in to or associated with the consumer's household device, such as a unit serial number, an IP address and the like. In some embodiments, the proxy may be created by an entity in a manner that guarantees that it is a unique alphanumeric identifier, for example, by use of a random number generator and/or a checking process may be utilized to compare the generated proxy to known proxies (to ensure that such a proxy does not already exist), and/or another type of process may be used to ensure uniqueness.

The gateway server 118 may be a central server, and it may function to route registration and/or transaction requests to the validation and translation server 308. The validation and translation server 308 may function to authenticate the proxy data and to translate and/or map it to an actual payment card account, for example, and to transmit that information and an authentication request to an issuer server (not shown) associated with the payment card issuer (financial institution) that issued that particular payment account (for example, the issuer of Card1 112). In some embodiments, the validation and translation server 308 is operated by a third party entity such as a payment service provider (PSP), or an electronic payment network, such as the one operated by MasterCard International Incorporated, as part of the payment infrastructure. Upon approval (for example, validation by both the validation and translation server and an issuer server), the payment credentials (including the payment account data and the proxy data) are securely stored, for example, in a database of the validation and translation server 308 and/or by the gateway server 118 for use in future transactions. A response is then transmitted to the STB 302 and/or TV 104 regarding the successful registration of the payment card account.

In some embodiments, the system may prompt the cardholder to choose a passcode or to confirm a parental control passcode. Such operation serves to allow various family members to safely use their individual cards and/or accounts when shopping, as well as control the use of the system by other family members, if so desired. In some embodiments, the STB 302 prompts the cardholder to enter the billing and/or shipping address details that are then stored in a dedicated storage element of a local storage device which may be the SE 304 to enable a completely automatic check-out process. In some other embodiments, the STB 302 prompts the cardholder to register additional payment cards, which follow the method explained above. In this case, the STB 302 may function to prompt the cardholder to confirm the previously entered billing and/or shipping address details that have already been entered, rather than require re-entry of such data.

In some embodiments, the STB 302 and TV 104 enables the cardholder to browse and/or review his or her list of registered payment cards (which may include credit card accounts, debit card accounts and/or pre-paid card accounts), and also may enable the consumer to select one or more preference settings for his or her payment card accounts. For example, Card1 112 may be set as the default payment card account that will be utilized for most online purchase transactions, and Card2 114 may be set up as the payment card account that is to be used when ordering food online from a restaurant. In addition, the STB 302 may enable the cardholder to delete, add, and/or change preferential ordering of the payment card data in the SE 304.

It should also be understood that, with regard to FIGS. 3A and 3B, as part of the registration process and/or purchase transaction process, the location of and/or an identifier associated with the consumer's device (such as the STB 302 or TV 104) may also be transmitted to the gateway server 118 for association with the card account information to add an additional layer of security to the system. For example, the consumer's cable provider may associate a unique serial number to each STB in their cable system so that, in some embodiments, that unique STB identifier could be an indication of the origin (a consumer's home) of a purchase transaction request. The unique STB identifier thus provides an additional data point that serves to raise the confidence level for an issuer that the purchase transaction originated from a particular consumer (cardholder). In some embodiments, instead of a unique serial number, the internet protocol (IP) address of the consumer's device could be used as an indication of the location of the consumer's device and/or origin of a purchase transaction request. Such operation is advantageous from a security standpoint because it is relatively easy to obtain and utilize such a unique serial number and/or IP address, the use of such an identifier is transparent to the consumer, and such operation increases the confidence level that the purchase transaction was initiated by the consumer who owns the payment account.

Figure 4:
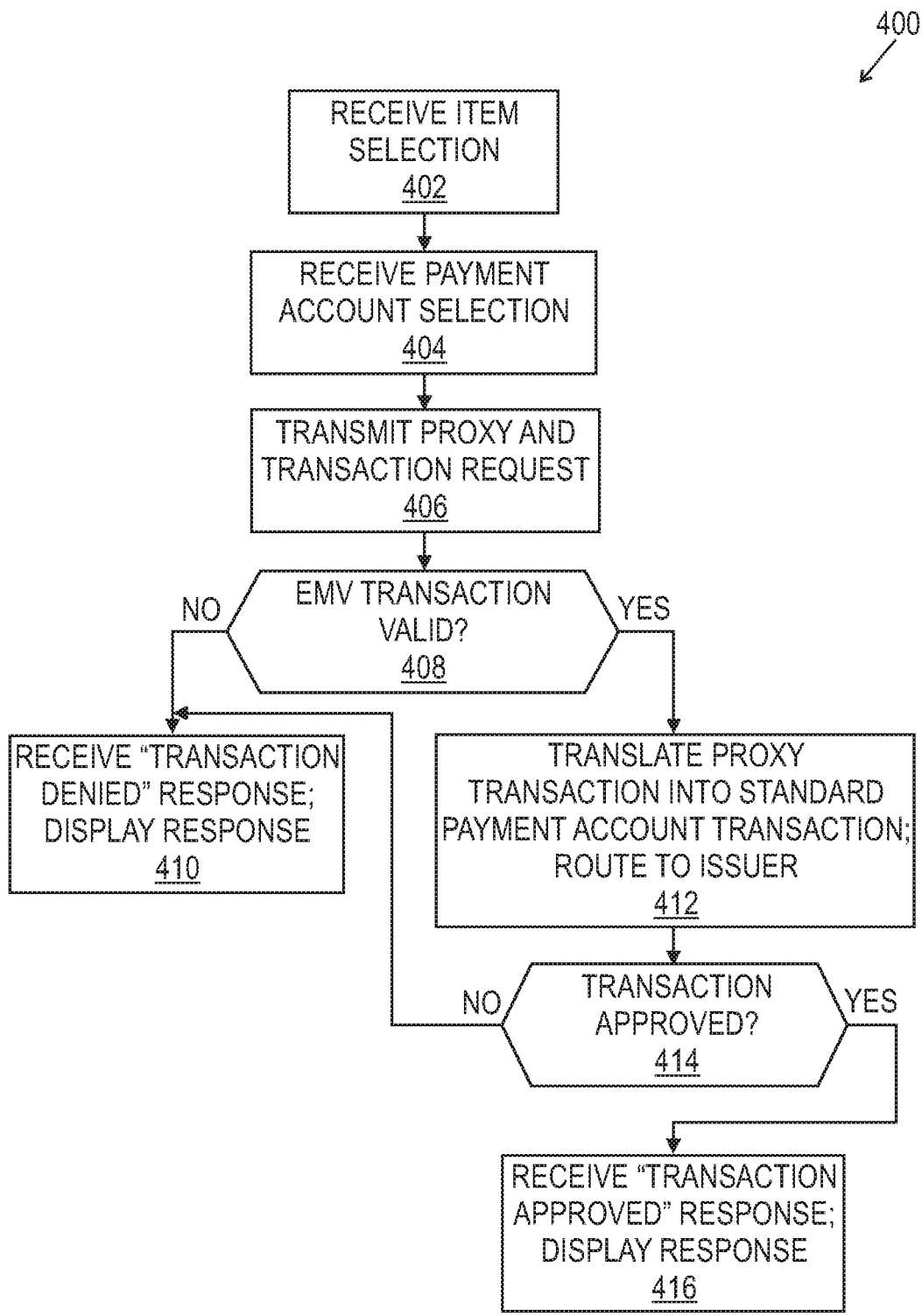
FIG. 4 is a flowchart illustrating a consumer transaction process utilizing the system of FIG. 3A and/or the system of FIG. 3B according to an embodiment of the invention.

FIG. 4 is a flowchart illustrating a cardholder transaction process 400 utilizing the system 300 of FIG. 3A and/or the system 320 of FIG. 3B according to an embodiment. The consumer utilizes the remote control 102 and the STB 302 to view images of products and/or services (not shown) on the display screen of his or her TV 104 in order to decide on a product or service to purchase. As mentioned above, a virtual mall may be provided by the cable-TV provider that includes a plurality of icons (not shown) for viewing by the consumer on the TV screen. The icons are associated with a plurality of merchants and/or retailers offering various products and services for purchase. For example, offerings may include local goods and/or services and food for delivery and/or take-out. The cable-TV provider may also offer pay-per view programs, viewer value packs and/or short-term viewing subscriptions. Icons or placeholders representing different types of goods or services may be displayed. For example, a digital media icon may represent music, games, and gambling services, and a direct response shopping icon may represent programs, commercials and infomercials. When selected, a particular icon may vanish and be replaced by a plurality of different icons associated with a particular merchant that represent particular offers for selection by the consumer from that merchant.

Referring again to the example of FIG. 4, the STB 302 receives 402 a product selection for purchase, such as a digital music player (to be obtained from an electronics merchant). Next, the STB 302 receives 404 the selected payment card account for the purchase transaction, which the consumer selected from a list of stored payment card accounts. In particular, the STB 302 causes the TV 104 to display the stored payment card credentials and billing address and/or shipping address details for selection by the consumer as the means of payment. The consumer or cardholder then makes a choice and, in some embodiments enters his or her unique PIN or passcode (or other CVM) to confirm that he or she wishes the transaction to continue. The STB 302 retrieves the payment proxy stored in the SE 304, and then transmits 406 the proxy with the transaction request via the Internet 116 to the gateway server 118 for forwarding to the validation and translation server 308. The validation and translation server 308 determines 408 whether or not the EMV transaction is valid. If the purchase transaction is not valid in step 408, then the STB 302 receives 410 a "transaction denied" response which the STB 302 causes to be displayed to the consumer, for example, on the screen of the TV 104. If the validation and translation server 308 determines 408 that the EMV transaction is valid, then the validation and translation server 308 performs a mapping function by translating 412 the proxy transaction into a standard payment card account transaction and routing it to the issuer of the payment account for authentication.

Thus, a standard EMV (or EMV-like) purchase transaction request is made to the payment infrastructure, and the included transaction details are similar to that of a standard payment transaction. It should be noted that communication between the proxy device (STB 302) and the online servers (the gateway server 118 and the validation and translation server 308) may employ protocols other than EMV, for example, which may involve using a static password or dynamic mechanisms. The transaction request is therefore routed to the payment infrastructure which validates the SE cryptogram (for example, an ARQC) and associates the SE proxy with a standard payment card PAN before forwarding it to the relevant card issuer.

Referring again to FIG. 4, the issuer (not shown) then determines 414 whether or not the payment transaction should be approved. If not, then the STB 302 receives 410 a "transaction denied" response which, in some embodiments, the STB 302 causes to be displayed to the consumer on the screen of the TV 104. If the issuer approves the payment transaction, then the STB 302 receives 416 a "transaction approved" response, which the STB 302 causes to be displayed to the consumer on the screen of the television 104.

With regard to the system 300 of FIG. 3A, the gateway server 118 may transmit the transaction request and a favorable authorization response to an appropriate merchant server, such as merchant server 126 for example (which is associated with a merchant store called "Electronics City", for example) via the Internet 116 so that that merchant can fulfill the order for the digital music player and be paid. But in the system 320 of FIG. 3B, the gateway server 118 is operably connected to each of the merchant servers 122, 124 and 126, and thus, directly transmits the transaction request and the authorization response to the merchant server 126. In either case, "Electronics City" (the electronics merchant) is notified of the purchase order, including the desired item, and is notified of the authorization for payment. Thus, Electronics City would respond by shipping the digital music player to the consumer's shipping address because that merchant is confident that payment will be provided. In some embodiments, the merchant also contacts the consumer, for example, via email and/or text message, to verify that the item will be shipped and that payment has been made. The issuer thus processes the payment transaction request with the knowledge that the payment infrastructure has validated the proxy (that is, the proxy ARQC) on its behalf, and in some embodiments, the method also includes processing the transaction in conjunction with a PIN and/or passcode received from the consumer for added security.

In some embodiments of the systems 300 and/or 320 and/or process 400, the Proxy device and/or protocol is/are based on the EMV standards, but other forms of cryptography could be substituted. In addition, as mentioned above, the Proxy device can be in the form of a USB device, an SD card, a SIM card, a micro-SD card and the like, but in some embodiments it may be fully dematerialized (that is, it may be a software construct or application in the SE 304 of the STB 302, for example). In addition, in some embodiments the validation and translation server 308 may be operable to flag "TV transactions" in a special manner as part of the payment transaction request message. Such operation may be advantageous because it can serve to inform an issuer of the original payment account that the transaction is secure (due to the proxy device validation process that has been utilized) and in some embodiments, may open the payment transaction to revisions, modifications and/or adjustments. Such revisions, modifications and/or adjustments may concern such criteria as payment guarantees, transaction fees, service fees, and the like affecting, for example, the issuers, third party providers and/or entities handling one or more functions of the payment infrastructure.

Figure 5A:
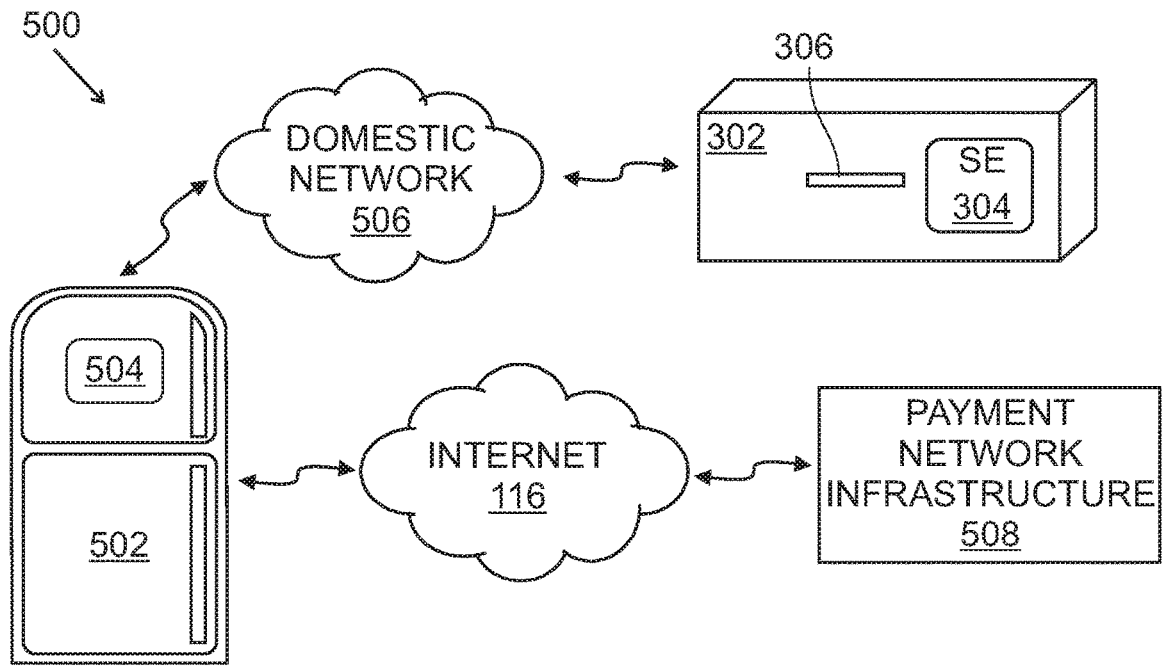
FIG. 5A is a block diagram of a system for permitting a consumer to purchase goods and/or services via at least one secondary Internet-connected device according to an embodiment of the invention.

FIG. 5A is a block diagram of a system 500 for permitting a consumer to purchase goods and/or services via at least one secondary Internet-connected device according to an embodiment. In this example, a "smart refrigerator" 502 is described as the secondary Internet-connected device, but it should be understood that many other types of devices could be utilized. Details concerning various components of and methods for operating the smart refrigerator are beyond the scope of the present disclosure and thus, will not be discussed in detail herein. For present purposes, it is sufficient that the reader understands that the smart refrigerator includes one or more sensors capable of and/or configured to keep track of food items stored therein and/or to self-monitor conditions within the refrigerator to make sure it is functioning properly, and further, that the smart refrigerator is capable of communicating with the STB 302 via a domestic network 506 (which, for example, may include a household router and/or a cable modem (not shown) configured for wireless communications).

Referring again to FIG. 5A, the smart refrigerator 502 may include a touch screen 504 for displaying a list of food items contained therein and for use by a consumer to order items that he or she prefers and/or needs. The smart refrigerator 502 is also configured to communicate with the payment network infrastructure 508 via the Internet 116. For example, if the smart refrigerator 502 recognizes that the consumer has run out of milk, it may be configured to request a payment card list from the STB 302 via the domestic network 506. (In this case, it is assumed that the STB 302 has already been utilized to register one or more payment accounts as described herein with regard to FIGS. 1A to 4.) The STB 302 may then operate to transmit a list of all of the registered or enrolled payment card accounts, and displays the list on the touch-screen 504 for selection of a payment account by the consumer. In some embodiments, the smart refrigerator may be configured to automatically select and/or utilize a particular payment card account (such as a default payment card account) for us in a particular type of purchase transaction, in which case the list of payment card accounts need not be displayed. Next, in some embodiments, the smart refrigerator 502 requests the payment credentials and a cryptogram from the STB 302, and the STB 302 responds by transmitting the requested credentials (for example, the PAN, an expiration date and a CVC code, and the like) and the associated cryptogram to the smart refrigerator 502. The smart refrigerator then submits (with or without further input from the consumer) an authorization request to the payment network infrastructure 508 via the Internet 116, wherein the authorization request may first be routed to a PSP and/or acquirer server (not shown). A process similar to that described above concerning authorization of the payment card account may occur, and then an authorization response may be transmitted back to the smart refrigerator 502 that includes either an approval or decline transaction message, which may be displayed on the display 504 for viewing by the consumer.

Figure 5B:
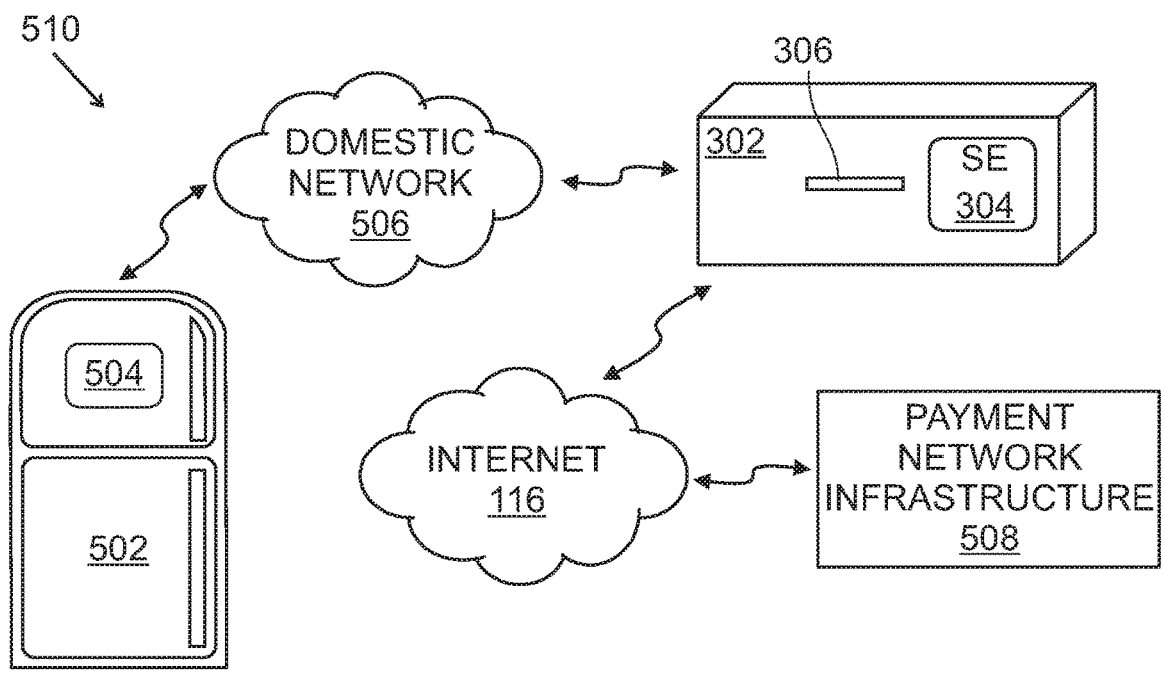
FIG. 5B is a block diagram of a system for permitting a consumer to purchase goods and/or services via at least one secondary Internet-connected device according to another embodiment of the invention.

FIG. 5B is a block diagram of a system 510 for permitting a consumer to purchase goods and/or services via at least one secondary Internet-connected device in accordance with another embodiment. As in the example of FIG. 5A, a smart refrigerator 502 is the secondary Internet-connected device, but it should be understood that many other types of Internet-capable devices could be utilized. As also mentioned above, details concerning various components of and methods for operating the smart refrigerator are beyond the scope of the present disclosure and thus, will not be discussed in detail herein.

Referring again to FIG. 5B, as in FIG. 5A the smart refrigerator 502 may include a touch screen 504 for displaying a list of food items that needs to be ordered. Such a list may include purchase details such as the product name(s), the cost of each product, and the merchant(s) from which to make the purchase(s). In the system 510, the smart refrigerator 502 is configured to communicate with the STB 302 via the domestic network 506 and functions to submit the purchase details to the STB 302. In some embodiments, the STB 302 automatically selects a payment card account and/or automatically utilizes a default payment card account to construct an authorization request. In other embodiments, the consumer may be prompted by the smart refrigerator and/or by the STB 302 (for example, by the STB 302 displaying a choice of payment accounts on a televisions screen) to select a payment account to use for a particular purchase transaction.

Once a payment account is chosen, the STB 302 prepares a purchase transaction authorization request that includes the payment account credentials (for example, the PAN, an expiration date and a CVC code, and the like) and, in some embodiments, an associated cryptogram or one-time password (OTP) and the purchase details (products, amount, merchants and the like). When the purchase transaction authorization request is ready, the STB 302 transmits the request via the Internet 116 to the payment network infrastructure 508, wherein the authorization request may first be routed to a PSP and/or and acquirer server (not shown). A process similar to that described above concerning authorization of the payment card account may occur, and then an authorization response is delivered back to the smart refrigerator 502 that includes either an approval or a decline transaction message.

While the above scenarios described with regard to FIGS. 5A and 5B concern a smart refrigerator as the secondary device being utilized in a domestic household environment, it is contemplated that other implementations could include other types of Internet-capable devices operating in other types of environments, such as in a public setting. For example, the processes described herein may be configured for use in Parking Garages wherein a central Payment Server interacts with a driver's smartphone to facilitate payment of parking fees. In another example, a system may be designed for use in hotel environments wherein cardholders may use, for example, their mobile phones to immediately engage with an electronic door lock (which may contain a payment server connection) to their hotel room. Such operation enables a fully automated check-in process wherein cardholders do not need to register at a front desk in order to obtain a room. Instead, the cardholders would be able to go straight to a hotel room and open the lock (when that hotel room is both unoccupied and housekeeping has made it available for use), and circuitry within the lock itself operates to immediately exchange payment credential data that can be utilized for automatic check-out purposes.

It is contemplated that a hotel system capable of operating in the above described manner would also be able to transmit a list of available hotel rooms upon request to the mobile telephone of a prospective hotel guest, for example, upon the arrival of the prospective hotel guest onto the grounds of the hotel. Such operation would permit that consumer/hotel guest to simply walk up to an available room and gain entry via his or her smartphone. Yet another environment in which such systems and methods may be advantageously employed is in the field of vending machines.

In addition, the local payment server (which may be the STB, for example, or another Internet-enable device) could be incorporated into the cable modem of a household, or into the router of a domestic or business environment, for example. Other possibilities include integrating the payment server into a home automation system, or into an alarm system, or into a similar system to enable any domestic WiFi and/or Internet-capable device to piggy-back on one or more payment credentials through a payment server interaction. Thus, the systems and processes described herein facilitate registration and online purchase transactions for consumers, and may also facilitate registration and other types of transactions for business owners, employees and the like.

As the term "payment transaction" is used herein and in the appended claims, it should be understood to include the types of transactions commonly referred to as "purchase transactions", which may be in connection with electronic commerce (e-Commerce) transactions that may involve payment card accounts and/or payment card systems. In addition, the term "payment card" or "payment card account" as used herein may refer to, for example, credit card accounts, debit card accounts, pre-paid card accounts or other financial accounts.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for generating consumer payment credentials during a purchase transaction using an Internet-connected appliance comprising:
    receiving, by a primary Internet-connected appliance via a domestic network from a secondary appliance, purchase transaction information comprising a product or service selection, a purchase price amount, and a merchant identifier;
    retrieving, by the primary Internet-connected appliance from a local dedicated storage element, payment card account data associated with a plurality of payment card accounts of a consumer;
    transmitting, by the primary Internet-connected appliance via the domestic network to the secondary appliance for display on a display screen, the payment card account data and a prompt for a passcode;
    receiving, by the primary Internet-connected appliance via the domestic network from the secondary appliance, a selected payment card account from the plurality of payment card accounts and the passcode from the consumer;
    determining, by the primary Internet-connected appliance, that the passcode is correct;
    generating, by the primary Internet-connected appliance, a purchase transaction authorization request based on the purchase transaction information and comprising payment account data associated with the selected payment card account;
    transmitting, by the primary Internet-connected appliance on behalf of the secondary appliance, the purchase transaction authorization request via the Internet to a gateway server computer;
    receiving, by the primary Internet-connected appliance via the Internet from the gateway server computer, a purchase transaction authorization response; and
    transmitting, by the primary Internet-connected appliance, the purchase transaction authorization response via the domestic network to the secondary appliance for display on the display screen and causing the secondary appliance to provide one of a good or service to the consumer.

2. The method of claim 1, further comprising, prior to receiving the purchase transaction information:
    reading, by a reader device associated with the primary Internet-connected appliance, payment account credential data from at least one payment device of the consumer;
    transmitting, by the primary Internet-connected appliance via the Internet to the gateway server computer, a cardholder registration request comprising the payment account credential data and proxy data derived from an attribute associated with the primary Internet-connected appliance;
    receiving, by the primary Internet-connected appliance from the gateway server computer, a cardholder verification request;
    prompting, by the primary Internet-connected appliance, the consumer to respond to the cardholder verification request;
    transmitting, by the primary Internet-connected appliance via the Internet to the gateway server computer, a response received from the consumer;
    receiving, by the primary Internet-connected appliance, a cardholder authentication message and an indication of successful registration of the cardholder's payment account;
    prompting, by the primary Internet-connected appliance, the consumer to enter billing and shipping address data; and
    storing, by the primary Internet-connected appliance, the payment account credential data in the dedicated storage element of the primary Internet-connected appliance.

3. The method of claim 2, further comprising, subsequent to transmitting the consumer response to the gateway server computer:
    receiving, by the primary Internet-connected appliance via the Internet from the gateway server computer, a negative cardholder authentication message; and displaying, by the primary Internet-connected appliance on a display screen, a registration failure message to the consumer.

4. The method of claim 1, wherein transmitting the purchase transaction authorization request further comprises transmitting, by the primary Internet-connected appliance to the payment gateway computer, a unique identifier associated with the primary Internet-connected appliance.

5. The method of claim 4, wherein the unique identifier of the primary Internet-connected appliance comprises at least one of a serial number and an internet protocol (IP) address.

6. The method of claim 1, wherein the payment account credential data comprises at least two of a cardholder name, a primary account number (PAN), an expiration date, a Cardholder Verification Code (CVC), billing and shipping address data, or proxy data.

7. The method of claim 1, wherein the primary Internet-connected appliance comprises one of a set-top box (STB), a flat-screen television, a microwave oven, and a refrigerator.

8. The method of claim 1, wherein the primary Internet-connected appliance comprises a smartphone of the consumer.

9. The method of claim 8, wherein the secondary appliance comprises one of a parking garage gate or a hotel room lock.

10. A transaction system comprising:
a domestic network;
a primary Internet-connected appliance operably connected to the domestic network;
a secondary appliance operably connected to the domestic network and configured for communication with the primary Internet-connected appliance; and
a gateway server computer operably connected via the Internet to the primary Internet-connected appliance;
wherein the primary Internet-connected appliance comprises a processor, a reader device operably connected to the processor, an internet connector component operably connected to the processor, and a storage device including a dedicated storage element, the storage device operably connected to the processor and storing instructions configured to cause the processor to:
receive, via the domestic network from the secondary appliance, purchase transaction information comprising a product or service selection, a purchase price amount, and a merchant identifier;
retrieve payment card account data associated with a plurality of payment card accounts of a consumer from a local dedicated storage element;
transmit the payment card account data and a prompt for a passcode via the domestic network to the secondary appliance for display on a display screen;
receive, via the domestic network from the secondary appliance, a selected payment card account from the plurality of payment card accounts and the passcode;
determine that the passcode is correct;
generate a purchase transaction authorization request based on the purchase transaction information and comprising payment account data associated with the selected payment card account;
transmit the purchase transaction authorization request via the Internet to the gateway server computer on behalf of the secondary Internet-connected appliance;
receive a purchase transaction authorization response via the Internet from the gateway server computer; and
transmit the purchase transaction authorization response via the domestic network to the secondary appliance for display and causing the secondary appliance to provide one of a good or service to a consumer.

11. The system of claim 10, wherein the storage device further comprises, prior to the instructions for receiving the purchase transaction information, instructions configured to cause the processor to:
read, by the reader device, payment account credential data from at least one payment device of the consumer;
transmit a cardholder registration request via the Internet to the gateway server computer, the cardholder registration request comprising the payment account credential data and proxy data derived from an attribute associated with the primary Internet-connected appliance;
receive a cardholder verification request from the gateway server computer;
prompt the consumer to respond to the cardholder verification request;
transmit a response received from the consumer via the Internet to the gateway server computer;
receive a cardholder authentication message from the gateway server computer and an indication of successful registration of the cardholder's payment account;
prompt the consumer to enter billing and shipping address data; and
store the payment account credential data in the dedicated storage element.

12. The system of claim 11, wherein the storage device further comprises, subsequent to the instructions for transmitting the consumer response via the Internet to the gateway server, instructions configured to cause the processor to:
receive a negative cardholder authentication message; and
display a registration failure message on a display screen to the consumer.

13. The system of claim 10, wherein the instructions for transmitting the purchase transaction authorization request further comprises instructions configured to cause the processor to transmit a unique identifier associated with the primary Internet-connected appliance via the Internet to the gateway server computer.

14. The system of claim 10, wherein the primary Internet-connected appliance comprises one of a set-top box (STB), a flat-screen television, a microwave oven, and a refrigerator.

15. The system of claim 10, wherein the primary Internet-connected appliance comprises a smartphone of the consumer.

16. The system of claim 15, wherein the secondary appliance comprises one of a parking garage gate or a hotel room lock.

* * * * *